United States Patent
El-Khoury et al.

(10) Patent No.: US 6,728,210 B1
(45) Date of Patent: Apr. 27, 2004

(54) MULTI-LOGICAL ACCESS FOR A SERIAL DATA LINK

(75) Inventors: Roland El-Khoury, Flower Mound, TX (US); Feng Mo, Carrollton, TX (US)

(73) Assignee: NEC America, Inc., Melville, NY (US)

( * ) Notice: Subject to any disclaimer, the term of this patent is extended or adjusted under 35 U.S.C. 154(b) by 0 days.

(21) Appl. No.: 09/217,324

(22) Filed: Dec. 21, 1998

(51) Int. Cl.⁷ .......................... H04L 5/14; H04L 12/58; H04J 3/06
(52) U.S. Cl. .......................... 370/231; 370/294; 370/394; 370/413; 370/474; 370/509
(58) Field of Search .................. 370/230, 235, 370/242, 244, 253, 255, 257, 265, 271, 276, 277, 280, 294, 310, 313, 314, 347, 349, 389, 392, 394, 231, 412, 413, 472, 473, 474, 475, 476, 509

(56) References Cited

U.S. PATENT DOCUMENTS

| | | | |
|---|---|---|---|
| 4,953,157 A | | 8/1990 | Franklin et al. |
| 5,007,051 A | * | 4/1991 | Dolkas et al. ............... 370/235 |
| 5,455,825 A | | 10/1995 | Lauer et al. |
| 5,465,288 A | * | 11/1995 | Falvey et al. ................ 455/418 |
| 5,546,389 A | | 8/1996 | Wippenbeck et al. |
| 5,579,312 A | | 11/1996 | Regache |
| 5,584,038 A | | 12/1996 | Papworth et al. |
| 5,675,813 A | | 10/1997 | Holmdahl |
| 5,710,908 A | * | 1/1998 | Man ........................... 709/230 |
| 5,748,629 A | | 5/1998 | Caldara et al. |
| 5,771,230 A | * | 6/1998 | Stoeckl et al. .......... 370/395.31 |
| 5,781,533 A | | 7/1998 | Manning et al. |
| 5,805,822 A | * | 9/1998 | Long et al. .................. 709/232 |
| 5,933,430 A | | 8/1999 | Osakabe et al. |
| 6,002,669 A | * | 12/1999 | White ......................... 370/235 |
| 6,061,504 A | * | 5/2000 | Tzelnic et al. ............... 709/219 |
| 6,108,550 A | * | 8/2000 | Wiorek et al. ............... 370/329 |
| 6,134,245 A | * | 10/2000 | Scarmalis ..................... 370/474 |
| 6,229,823 B1 | * | 5/2001 | Scarmalis ..................... 370/477 |
| 6,273,622 B1 | * | 8/2001 | Ben-David ................... 709/230 |
| 6,308,062 B1 | * | 10/2001 | Chien et al. ................. 455/420 |
| 6,334,161 B1 | | 12/2001 | Suzuki et al. |
| 6,366,590 B2 | | 4/2002 | Hu |
| 6,389,016 B1 | * | 5/2002 | Sabaa et al. ................. 370/389 |

* cited by examiner

Primary Examiner—Hassan Kizou
Assistant Examiner—Ahmed Elallam
(74) Attorney, Agent, or Firm—Scully, Scott, Murphy & Presser

(57) ABSTRACT

A multi-logical access for a serial data link designed with a multi-logical serial interface protocol which permits multi-drop applications to communicate in a time division multiplex mode over a singular drop or physical serial link such as an RS-232 link. Data is exchanged over the serial data link between multiple applications on a transmitter side of the serial data link and multiple applications on a receiver side of the serial data link. Both the transmitter and the receiver have a link layer connected to the serial data link for handling the transmission/receiving of packets through the serial data link, for detecting the start/end of each packet, and to ensure the sequence of the packets. Both the transmitter and the receiver also have a relay layer connected between the multiple applications and the link layer, which operates to allow the different access functions to share the serial data link. Each link layer and each relay layer includes functions of protocol synchronization to provide for error-detection and error-recovery in the transmission of packets. The multi-logical access provides full duplex communication between a hand held telephone and a PC over the serial data link, wherein the portable hand held telephone and the PC each comprises a link layer and a relay layer.

42 Claims, 13 Drawing Sheets

6(a) 0xAA,0xCC,0xAA,0xCC,6,0x10,5,86,1,2,3,4,5,6,0xFF,0xAA,0xCC,0xAA,0xCC,...

Data packet trailer will be checked to guarantee good LDUs.

6(b) 0xAA,0xCC,0xAA,0xCC,6,0x10,5,86,1,2,3,4,5,6,0xAA,0xCC,0xAA,0xCC,...

Trailer missing (corrupted data, Reset, until next preamble).

FIGURE 6

Scenario 1: Retransmitt trigger event

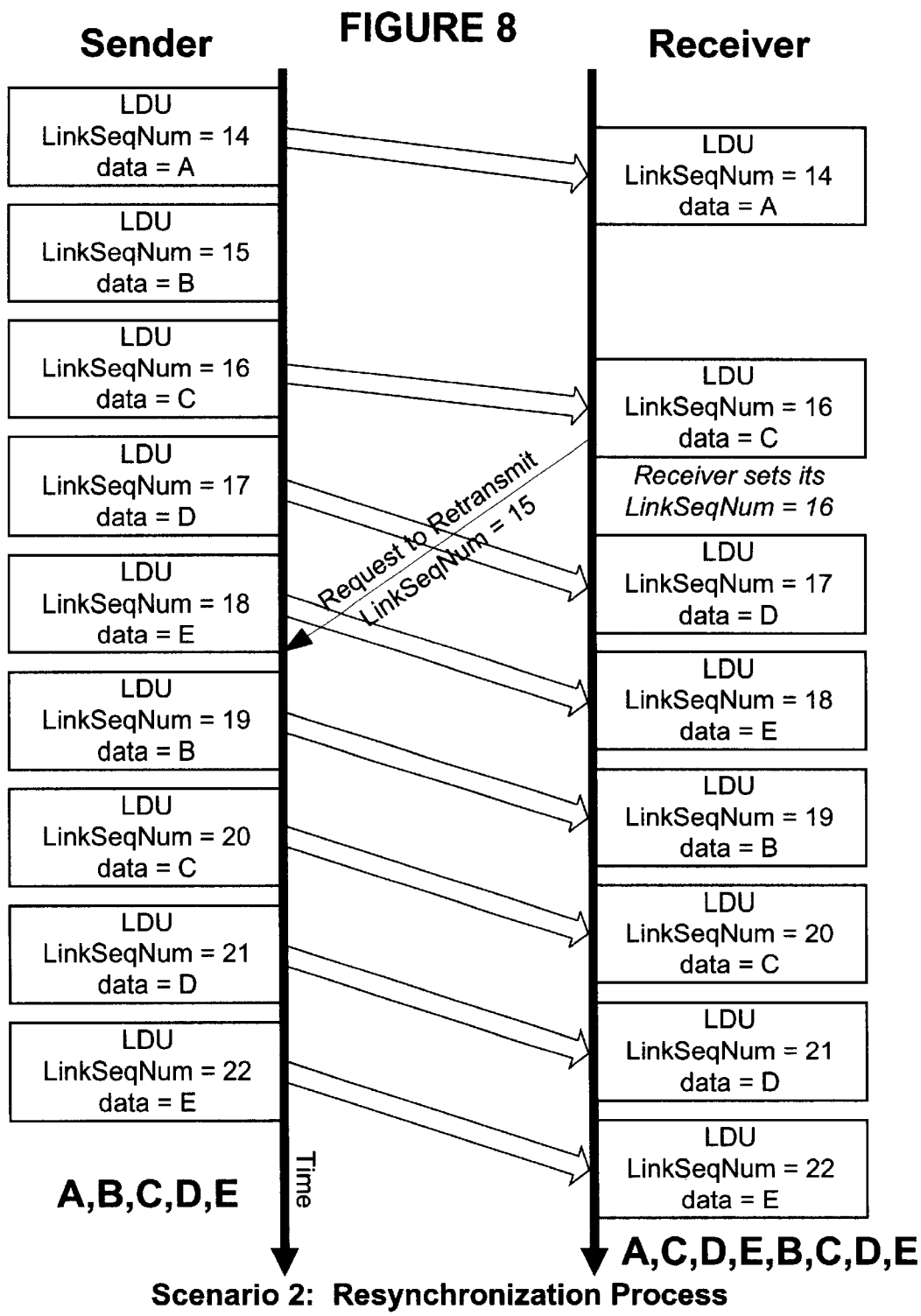
Scenario 2: Resynchronization Process

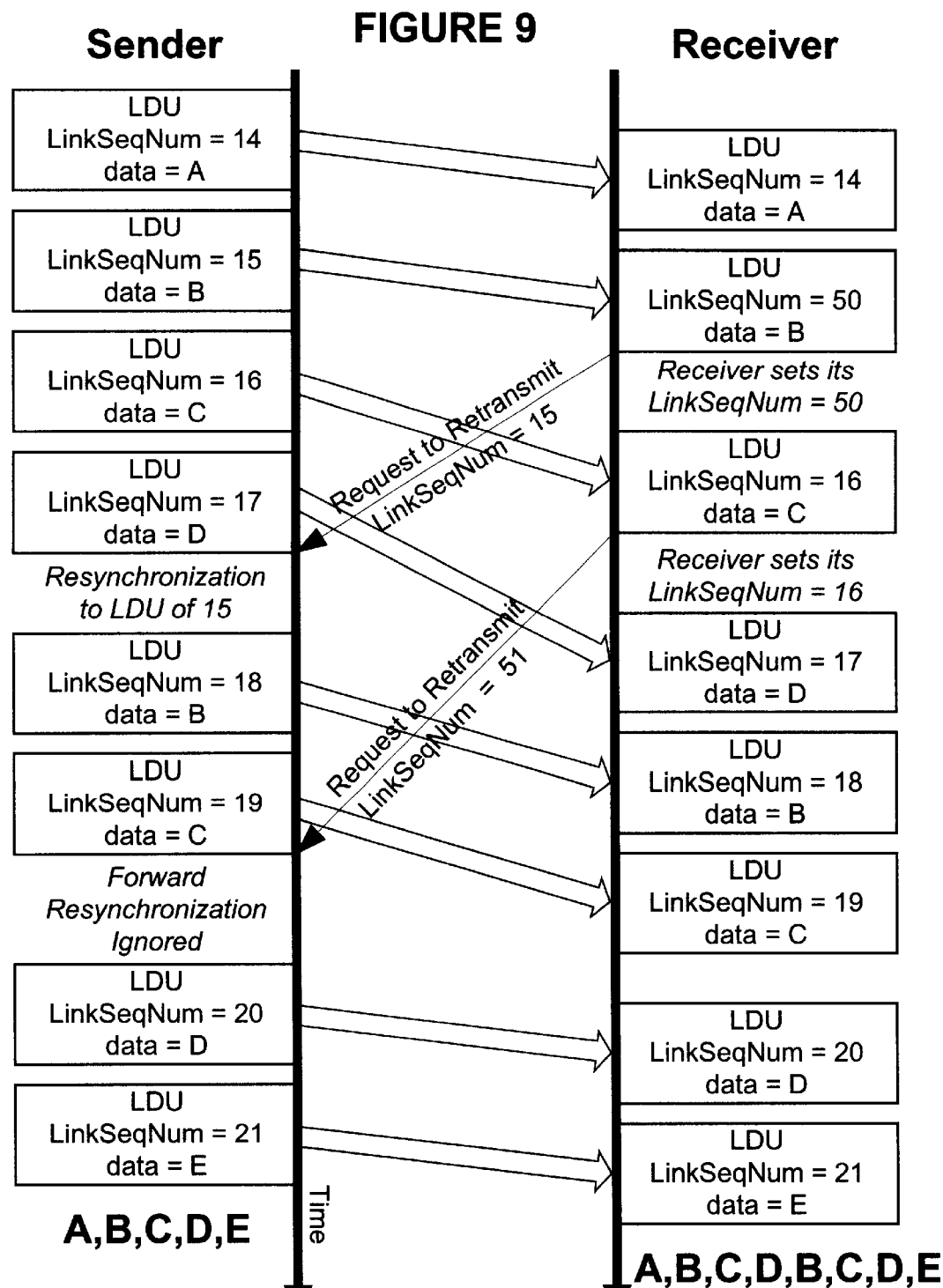
Scenario 3: Ignored Forward Resynchronization

MULTI-LOGICAL ACCESS FOR A SERIAL DATA LINK

FIELD OF THE INVENTION

The present invention relates generally to a multi-logical access for a serial data link, and more particularly pertains to a driver task designed with a multi-logical connectionless serial interface protocol which permits multi-drop processes or applications to communicate in a time division multiplex mode over a singular drop physical serial data link such as an RS-232 line.

The present invention permits time division multiplexing of data from different applications or processes over a serial data link as if each had dedicated control of the physical serial data link. In greater detail, the subject invention provides a driver task with a common data link layer which allows multiple and different applications running on a device to communicate with a host computer without any limitation or interference from other applications using the same physical serial data link. The present invention provides a flexible, reliable, robust and simple communications protocol between a performance sensitive device and other similar devices.

DISCUSSION OF THE PRIOR ART

In the prior art when a plurality of using programs or applications have competed for the transfer of data using a serial I/O scheme, various implementations have been employed and are well known.

A first prior art approach permits an operating system to arbitrate and allocate which one of the many potential using programs will actually access the serial I/O device and for what times. Upon completion of usage of the serial I/O device by the selected using program, complete control of usage of the serial I/O device is returned to the operating system, which then permits other using programs to access the serial I/O device.

A second prior art approach, similar to the first approach, permits the using program to maintain exclusive control over the serial I/O device (commonly referred to as "locking" the serial I/O device) until such time as the selected using program completes its data transfer, or is terminated. This approach has typically been employed in transferring data to printers, or in the transfer of data to modems. These prior art approaches generally require the non-selected using programs to wait until such time as the selected using program completes its task.

The present invention provides a connectionless serial interface protocol, with connectionless meaning that the protocol operates without a single defined hard connection between a transmitter and a receiver.

A data communication system entitled KERMIT is available in the prior art which incorporates a concept similar to the transmitter sliding window of the present invention, which allows the retransmission of one or more data units in the event of a corruption of previously transmitted data units. However, the KERMIT data communication system does not incorporate a data buffering system on the receiver side similar to that of the present invention.

SUMMARY OF THE INVENTION

Accordingly, it is a primary objective of the present invention to provide multi-logical access over a serial data link. The invention protocol permits multi-drop processes or applications to communicate in a time division multiplex mode over a singular physical serial link such as an RS-232 line or the like.

The present invention provides a connectionless serial interface protocol, with connectionless meaning that the protocol operates without a single defined hard connection between a transmitter and a receiver A further object of the subject invention is the provision of a multi-logical access to a serial data link which allows multiple and different applications running on a device to communicate with a host computer without any limitation or interference from other applications using the same data link and with a flexible, reliable, robust and simple communications protocol.

Driver Task Design Requirements

The driver task state machine of the present invention is designed to meet the following:

1) The driver task provides multi-logical accesses (time division multiplex) over a physical serial link, such as an RS-232 serial line.

2) The driver task provides a full duplex and robust communication protocol.

3) The driver physical layer is implemented in a 3-wire RS-232 protocol.

4) The driver task is able to handle more logical accesses and different data types without any modifications to its code.

5) The driver task allows other tasks (applications) to configure options of how data is to be received, to have duplicates or no duplicates, out-of-sequence or only in-sequence data.

6) The driver task does not receive any RTOS (Real Time Operating System) messages.

7) The driver task is able to maintain statistics on dropped messages or discarded data.

8) The communications protocol is capable of error-free continuous full duplex data transmission at 57.6 KBPS between a HHP (Hand Held Phone) and a host PC, with the load on the 13-MHZ 186 CPU from the HHP being no greater than 25% of the CPU time.

9) If a transmission error occurs that causes part of a transmitted data unit to be missing or corrupted, this condition is detected by the receiving driver task in the HHP or host PC. The receiving driver task discards the whole data unit rather than passing the incomplete or corrupted data unit to other tasks. A data unit in this requirement means the data passed to the driver task in a single API (Application Program Interface) function call. A data unit can contain between 1 and 1024 bytes of data inclusive.

10) The Driver Task implemented in the preferred embodiment was designed for use in local connections (with no network or device inbetween).

BRIEF DESCRIPTION OF THE DRAWINGS

The foregoing objects and advantages of the present invention for a multi-logical access for a serial data link may be more readily understood by one skilled in the art with reference being had to the following detailed description of a preferred embodiment thereof, taken in conjunction with the accompanying drawings wherein like elements are designated by identical reference characters throughout the several views, and in which:

FIG. 6 illustrates how the RelaySeqNum field is used as a trailer to further strengthen the link layer error checking.

FIG. 8 is a graphic representation of a second scenario of a retransmit trigger event in which a corrupted data transmission is successfully retransmitted.

FIG. 9 is a graphic representation of a third scenario of a retransmit trigger event in which the transmitter receives a request to retransmit with a forward resynchronization which is disregarded.

DETAILED DESCRIPTION OF THE DRAWINGS

Figure 1:
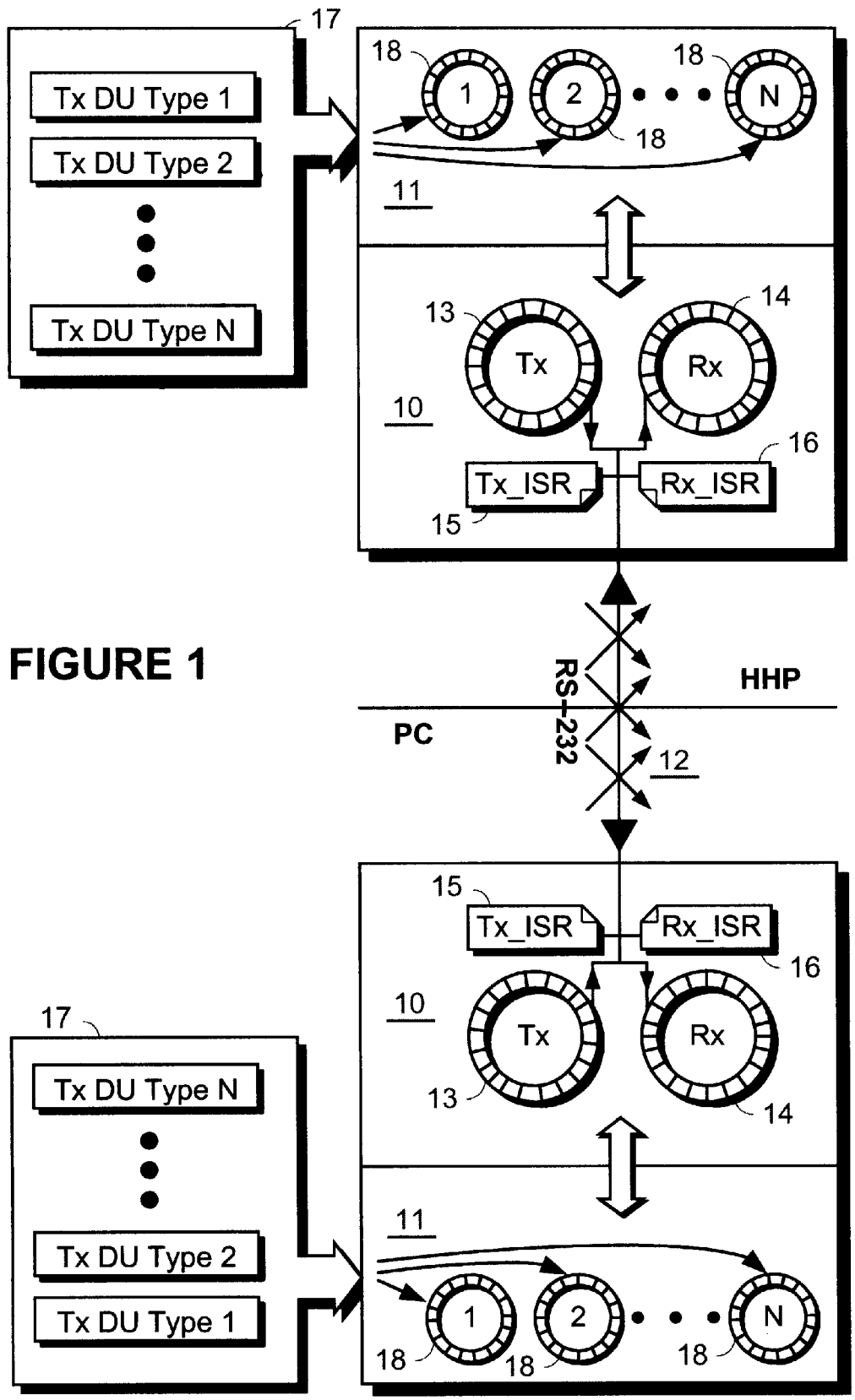
FIG. 1 is a system block diagram of one embodiment of the present invention for a driver task wherein a HHP (hand held phone) communicates with a PC over an RS-232 serial data line, and illustrates the physical symmetrical nature of both the HHP and the PC about the serial data link, wherein each of the HHP and PC comprise a symmetrically similar link layer and relay layer.

The following assumptions are made throughout this specification.

1) Except where logging error statistics are to be used to tune the performance of the driver task, their mention is omitted, which is not to suggest that they are not utilized at many places in the code.

2) The Rx (Receiver) and Tx (Transmitter) Queues are circular queues. Any attempt to increment pointers to either queue is always adjusted by a modulo function (discrete integer) using the queue size or its equivalent. It should be noted that this is an interrupt (event) driven, multi-tasking system. Interrupts are disabled if a shared global variable is being modified or being used to make a decision.

3) This specification is oriented toward an HHP implementation more than a PC implementation specifically on issues like its interface and memory management. The PC implementation has different design constraints and user interface issues, however the link and relay algorithms for both are essentially the same.

Driver Task State Machine

The present invention provides multi-logical (time division multiplex) accesses over a physical serial port, such as an RS 232 serial port. The tasks of the HHP (hand held telephone) can be engaged in full duplex and intelligent communications with the PC for different applications such as programming and auto-calibration.

Communications Between the Driver Task and the Other Tasks

Applications communicate with the Driver Task to exchange data with the host computer through the RS 232 serial port.

Task Registration

In order to receive or transmit data, every application must register (to provide for identification of each task). Applications register by updating a serial interface structure and calling a registration function. Once an application has registered, it may transmit data across the serial interface. The protocol uses information in the serial interface structure to manage data transmission and reception. When the data is received at the other end of the serial interface, it is processed by the Driver Task. When the data is complete, the driver notifies the registered recipient based on information in the serial interface structure. The data will be discarded if no application has registered to receive the data. Applications may dynamically deregister and reregister in order to change registration parameters. No change of registration parameters is permitted as long as the task is registered.

Communication Originated by an Application to the Driver Task

The Driver Task does not have an RTOS (Real Time Operating System) message loop. Therefore, applications do not send RTOS messages to the driver task. Data is sent from an application to the driver task using only Driver API (Application Program Interface) function calls. When any application sends data contained in a data buffer to the Driver Task through an API function call, the application is able to use the data buffer again as soon as the function call is finished. The Driver Task does not access the data buffer directly. The data sent to the Driver Task may or may not be transmitted to the host computer over the serial link depending upon the state of the Driver Task, with constraints as discussed hereinbelow. If the data is not transmitted, it is discarded. There is an API function to force the Driver Task to either one of the possible states.

Communication Originated by the Driver Task to Another Task

To be able to receive data from the Driver Task, a recipient application must register with the Driver Task. Once a recipient application has registered, any RTOS messages are sent to notify the application. The RTOS message passes a pointer to the start of the data buffer and the data length. Once an application has finished processing the Data Unit then it accesses a function to signal the Driver Task to free the memory. New messages are dropped if no space is available, and statistics are logged as per requirements.

The Packet Based Protocol

The packet-based protocol is comprised of two layers, a Link Layer 10 and a Relay Layer 11, as illustrated in FIG.

1, wherein each layer communicates with an adjacent layer but does not become involved in the functions of the adjacent layer. The Link Layer 10 is positioned immediately above the physical data link 12 to handle the transmission/receiving of Link Data Units across the serial data link. The Relay Layer provides functions for different data sources/destinations to share the serial data link. In each layer, there are built-in mechanisms of protocol synchronization, and when combined together, the protocol synchronization provides a powerful set of error-detection and error-recovery features. For this protocol, it is assumed that the Driver Task will run at least once every 50 msecs with enough time to perform all pending operations.

Relay Layer Protocol

The Relay Layer 11 constitutes the interface between the Driver Task and applications (other tasks). On the transmission side, the Relay Layer provides an "access function" through which data to be transmitted is passed to the driver task. On the receiver side, data with specific data ID are sent to designated applications [tasks] through RTOS messages. Data transmitted in one function call (request for a transfer of data) is considered a single unit and is received as a Data Unit (DU). The maximum size of a DU is 1 Kbyte. If an error occurs in the transmission of a Data Unit, the whole Data Unit is discarded by the receiving Driver Task. Any DU that has a zero length of data is ignored by the Relay Layer and is not transmitted.

Link Layer Protocol

Figure 3:
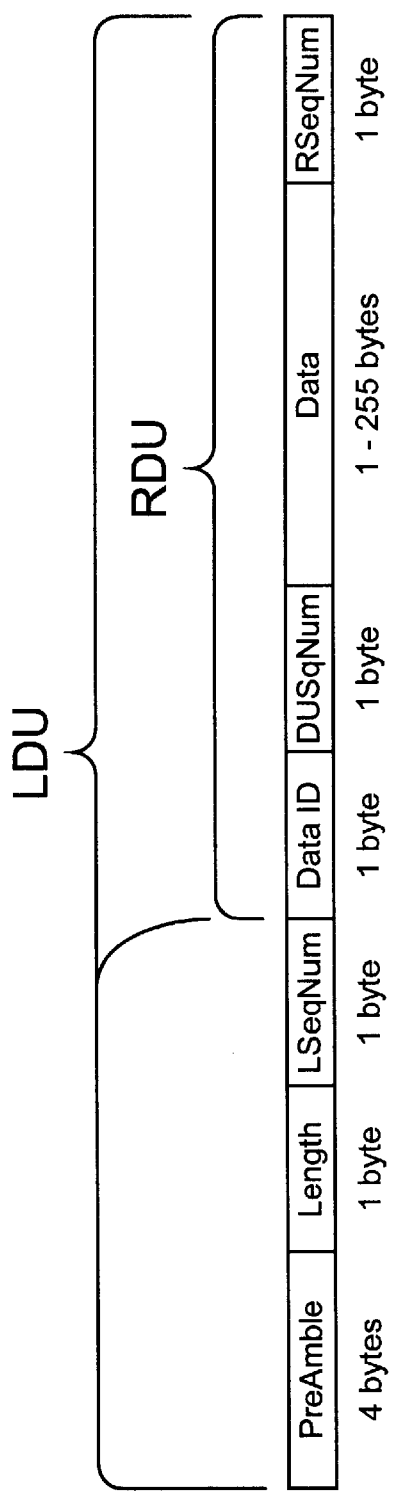
FIG. 3 illustrates the structure of the different fields of a Link Data Unit (LDU) which the link layer utilizes for the transmission/receiving of data over the serial data link.

The Link Layer 10 refers to the actual transmission/receiving of the data bytes over the serial link. This is accomplished by carrying each Data Unit (DU) in a single or multiple Link Data Units. A (DU) single Link Layer Link Data Unit is called an LDU, and is illustrated in FIG. 3. The Link Layer's main purpose is to be able to detect the start/end of an LDR or packet and guarantee that the LDU or packet stream is continuous.

System Block Diagram View

The serial data link is shared by multiple logical entities at the same time. It is the driver's responsibility to transfer, multiplex and de-multiplex the Data Units so that each application perceives the serial data link as being allocated only to its own service.

FIG. 1 is a system block diagram of the driver task wherein a HHP (hand held phone) communicates with a PC over an RS-232 serial data line, and illustrates the symmetrical nature of both the HHP and the PC about the serial link. The HHP and PC each comprise a link layer 10 and a relay layer 11. The link layer is connected to the RS-232 serial data line 12, and functions to detect the start/end of LDUs and to ensure the sequence of the LDUs. The link layer comprises a driver transmit TX serial queue 13 and a driver receiver RX serial queue 14, and associated transmit Tx and Rx Interrupt Service Routines (ISR) 15, 16. The Relay Layer is connected between multiple applications (TX DU Types) 17 and the Link Layer, and functions to provide access functions with APIs to receive DUs, to use RTOS messages to deliver DUs, and to assemble and disassemble DUs to/from RDUs [LDUs]. The relay layer receives data to be transmitted from the applications, and delivers received data to data storages or mailboxes 18 associated with each of the applications.

Figure 2:
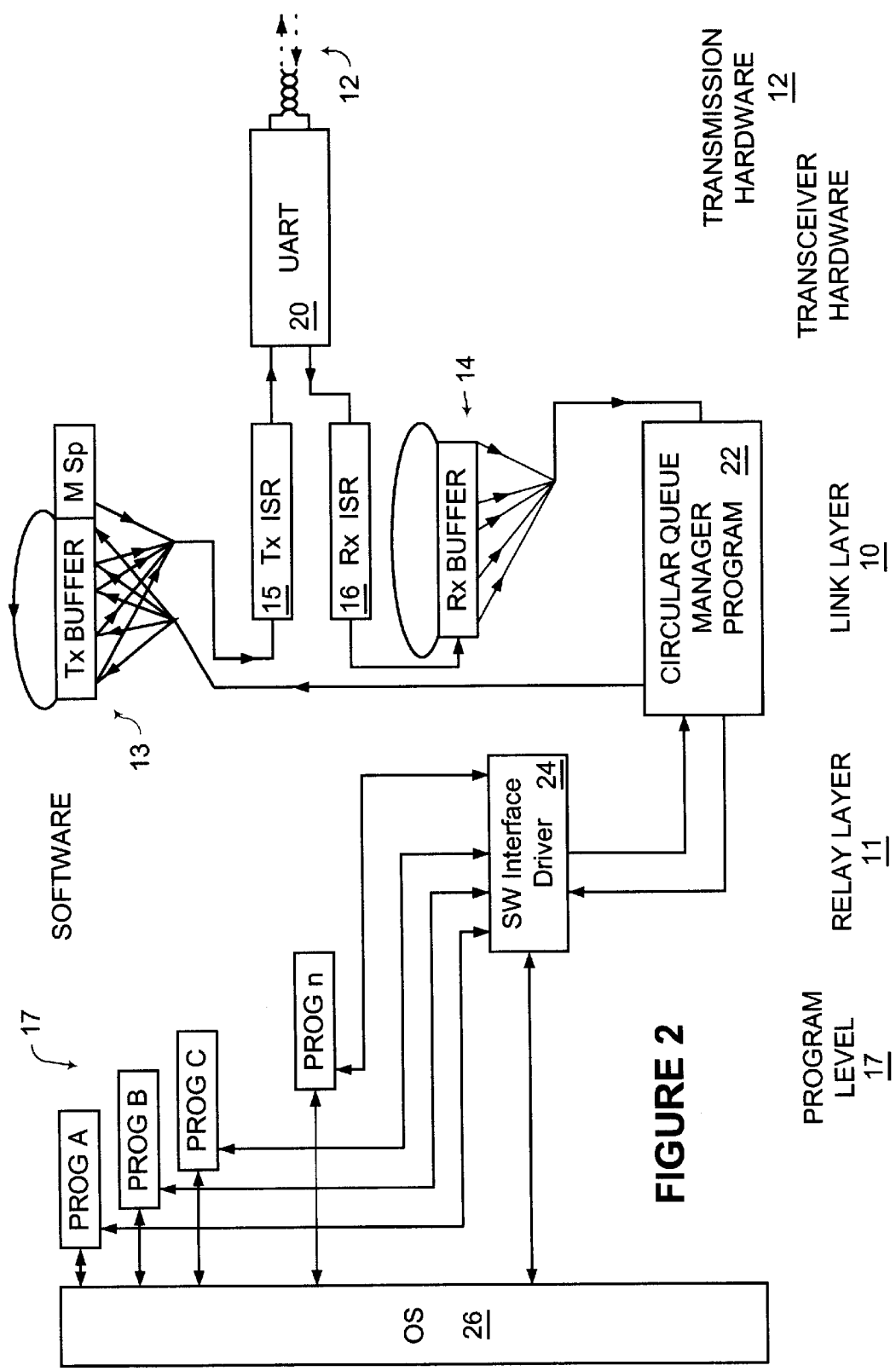
FIG. 2 illustrates an embodiment of the present invention wherein a plurality of programs or applications are competing for the use of only one serial output device.

FIG. 2 illustrates an embodiment of the present invention wherein a plurality of programs or applications (17) A, B . . . n are competing for the use of only one serial output device 12. Generally, one or more of many programs (applications 17) are, competing for the use of a limited number of or perhaps only one serial output device such as RS-232 serial data line 12. A serial input/output I/O device can include devices used to transfer data from a first device or processing unit to a second device or processing unit, such as: 1) simple buffers and drivers; 2) a modem; 3) an infrared input/output device; 4) a Universal Asynchronous Receiver Transmitter (UART). FIG. 2 illustrates a serial input/output UART 20 which is capable of full duplex transmission of data.

A manager program 22 permits multiple access while allowing each using application or program to have apparent dedicated access to the limited number of serial I/O devices. Basically, for a program (application 17) to transfer data to a corresponding program, then the program 17 first registers with the manager program 22 to obtain a unique identifier ID. Using the identifier, the application program 17 begins transfer of data by communicating with a software interface driver 24 which incorporates control and transfer information bytes with the data to be transferred. The data and the control and transfer information bytes are written into the circular transmitter buffer 13 using internal buses associated with a central processing unit (cpu) or operating system 26. Pointer methods to identify the data within the main memory are not preferred or used as the data is being consolidated into the circular transmitter buffer 13 for real time transfer. Once transfer of the data is enabled, then the UART 20 signals the controlling cpu or operating system 26 of its availability to transfer data. Bytes of data are transferred from the buffer 13 to the UART 20 by transmitter interrupt service routines (ISRs) 15. Since the circular transmitter buffer is a FIFO type buffer, the read pointer identifies the next available data byte for transfer. Upon receipt of one or more of the bytes, the UART 20 processes the received data bytes, serializes the bytes into data, and transmits the serialized bits using a serial data link. FIG. 2 illustrates a software program employing a circular queue, which could also be realized by an operating system implementation or by a computer design.

Packet Structure

FIG. 3 illustrates the packet structure of the protocol of an LDU (link data unit) which comprises in sequence a Preamble, Length, Link Seq Num, Data ID, DU Seq Num, Data and Relay Seq Num. The Preamble, Length, Link Seq Num, Data ID, DU Seq Num and Relay Seq Num comprise overhead, whereas the Data comprises the actual data payload.

A DU (Data Unit) comprises as many LDUs (Link Data Units) as are required to transmit one function call for an application. The Data ID, DU Seq Num, Data, and Relay Seq Num comprise an RDU (Relay Data Unit). As explained hereinbelow, a Data Unit (DU) is disassembled/assembled into RDUs (Relay Data Units) in the Relay Layer, and the RDUs are converted into LDUs (Link Data Units) in the Link Layer.

The packet structure of the protocol comprises in detail (Refer to FIG. 11b) the following Fields:

Preamble: Fixed to four bytes of value 0xAA, 0xCC, 0xAA, 0xCC bytes, which are hexadecimal representations and indicate the start of an LDU or a packet.

Length: 1–255 indicates the length of the Link Data Unit in bytes.

LinkSeqNum (LSeqNum)(LSN): 0–255 indicates the sequence number of the packet LDU or relative to other LDU's or packets. The LinkSeqNum is incremented with each LDU or packet transmitted, whether this is a new LDU or packet or a retransmitted LDU or packet.

DataID(DIDs): 0 through 199 identify valid data addresses; 200 through 255 are reserved for internal protocol use. Data Id 0 is currently used for handling diagnostic messages for the HHP.

DUSeqNum (DUSN): 0–255 indicates the sequence number of Data Units having the same DataID.

RelaySeqNum (RSN): 1, 2, 3, 4, −1, −2, −3, −4, −5 indicates the sequence number of the Relay Data Uint in the Data Unit. The RelaySeqNum of a Data Unit starts with 1 and increments with each packet. The sign of the RelaySeqNum field of the last Relay Data Unit of a Data unit is negated.

Data: Payload data.

Note that the set of values of the RelaySeqNum field should never overlap any of the values in the Preamble field.

Figure 11A:
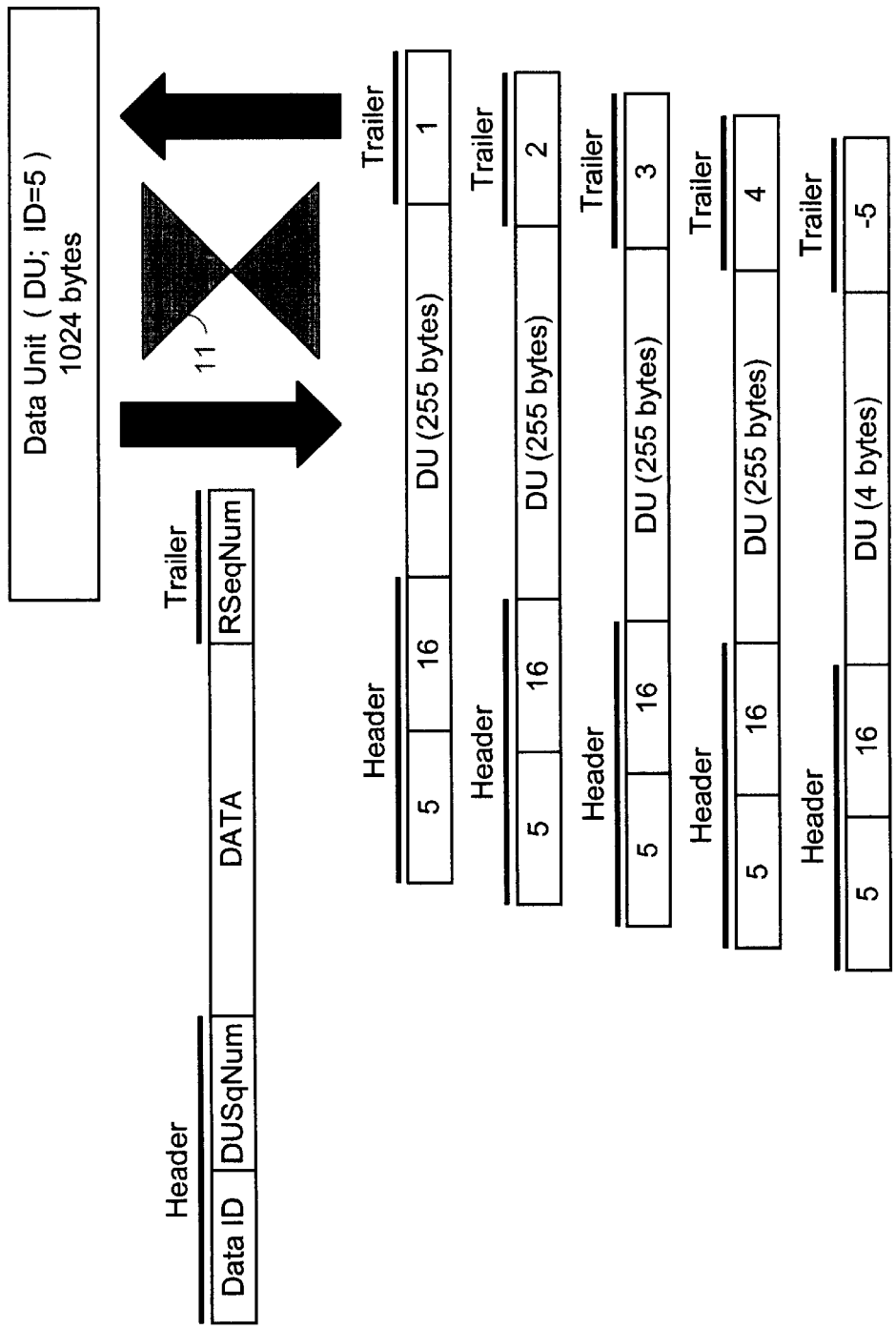
FIG. 11(a) illustrates the disassembly/assembly of a large Data Unit (DU) of 1024 bytes into/from five smaller Relay Data Units (RDUs), as is performed in the relay layer.

FIG. 11(a) illustrates the disassembly/assembly of a large Data Unit (DU) of 1024 bytes into/from five RDUs, as is performed in the Relay Layer. The large Data Unit of 1024 bytes is disassembled into 4 maximal data length (255 bytes) RDU packets and a remainder data RDU packet of 4 bytes. Each of the five RDU packets is assigned a header comprising a Data ID (5) and a DUSeqNum (16) and a trailer RelaySeqNum of respectively 1, 2, 3, 4 and −5 (wherein the minus indicates the last RDU packet). The five RDU packets are then directed to the Link Layer for processing into five LDU or packets, wherein each of the LDU's is as indicated by FIG. 3.

The Preamble consists of 4 bytes of value "0xAA, 0xCC, 0xAA, 0xCC" (in hexadecimal representation). On the transmitter side, the Preamble is sent as the start of every LDU or packet.

LDU Transmission Protocol

Preamble Field

The preamble consists of 4 bytes of value "0xAA, 0xCC, 0xAA, 0xCC" (in hexadecimal representation). On the transmitter side, the Preamble is sent as the start of every LDU or packet.

Figure 4:
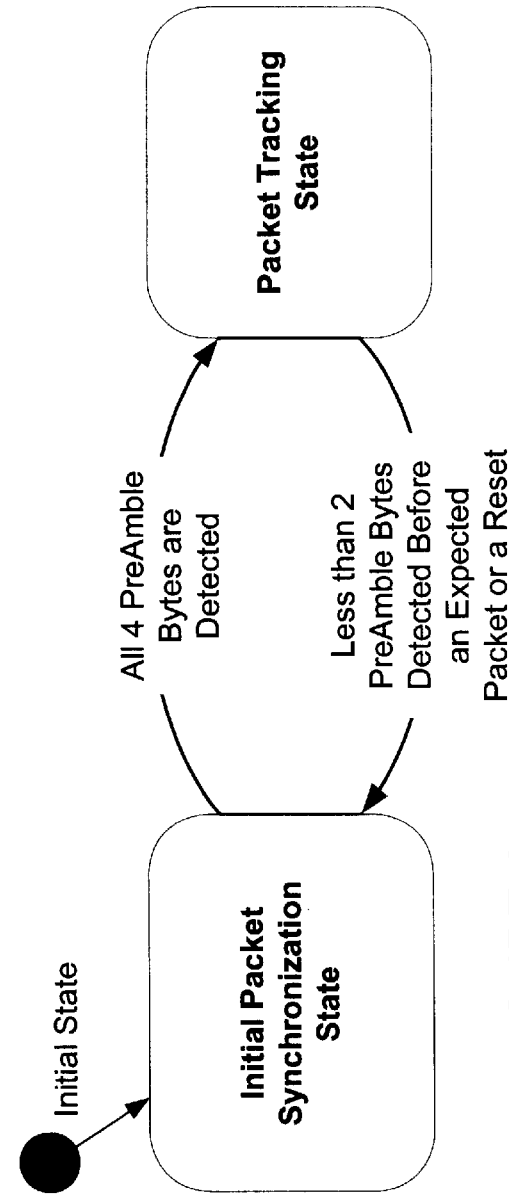
FIG. 4 illustrates graphically the relationship of an initial acquisition of a packet synchronization state to a packet tracking state.

FIG. 4 illustrates graphically the relationship of an initial acquisition of the packet synchronization mode to a packet tracking mode. On the receiver side, during initial acquisition of packet synchronization, all four bytes of the Preamble must be detected before switching to the packet tracking state.

After the initial synchronization is achieved, the receiver enters the packet-tracking mode. In the packet tracking mode, two or more Preamble bytes need to be detected before each packet (minimum of two bytes in the Preamble can only mean 0xAA followed by 0xCC. Other combinations are not expected). If less than two Preamble bytes are detected before an expected packet, the receiver enters the initial acquisition mode.

Figure 5:
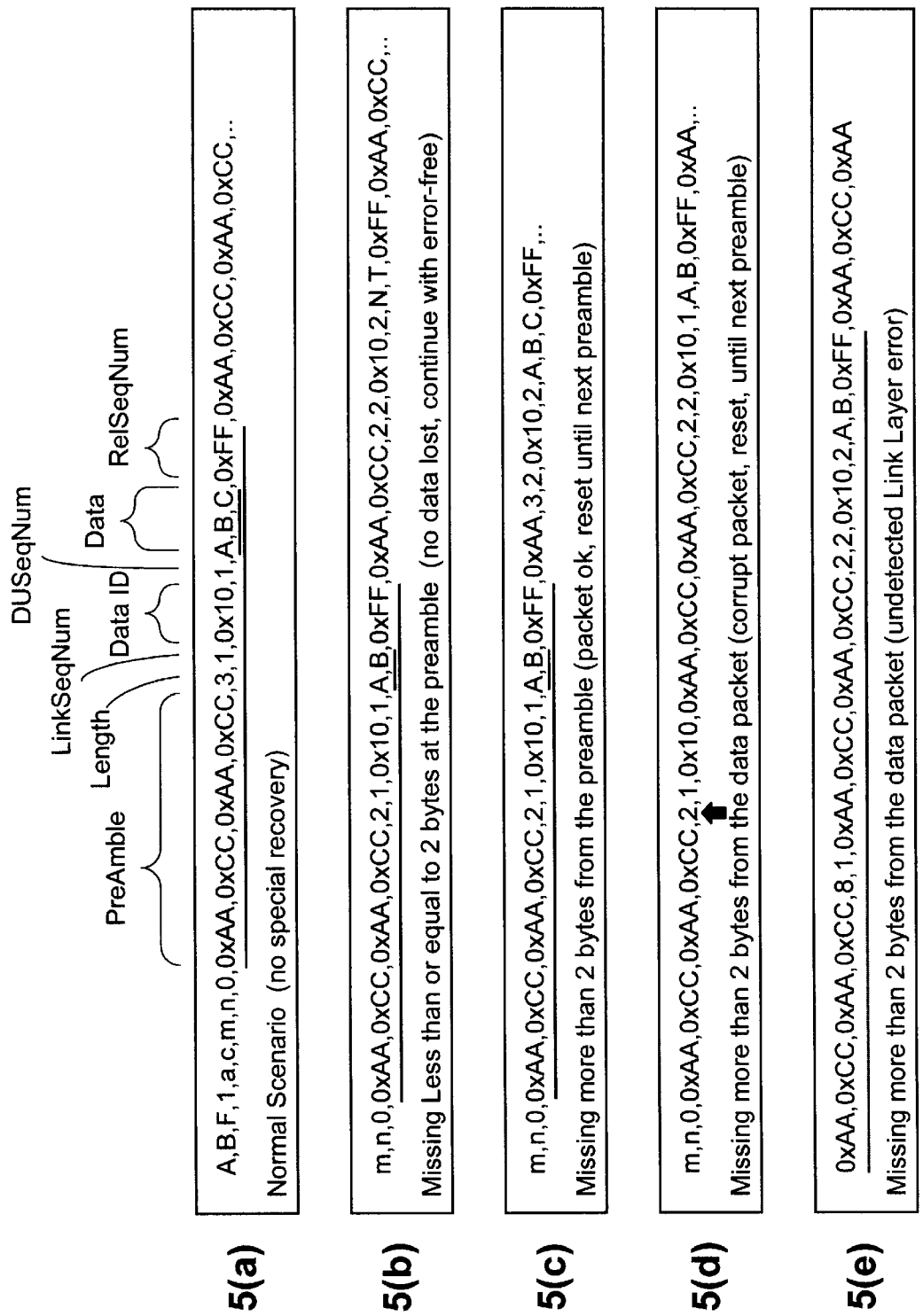
FIG. 5 illustrates the universal set of possibilities of both normal data transmission scenarios with no special data recovery problems, and also abnormal data transmission scenarios with data recovery problems.

FIG. 5 illustrates the scenarios which define the universal set of possibilities.

FIG. 5(a) illustrates a normal data transmission scenario with no special data recovery problems, in which a single LDU, having a structure as illustrated in FIG. 3, is underlined, and the Data payload data is double underlined. The LDU ends with the Relay Seq Num 0xFF, which is a negative representation of minus one in twos complement. As illustrated, the underlined LDU is followed by the header (0xAA, etc.) of the next LDU.

FIG. 5(b) illustrates a normal underlined LDU having the Data or payload data double underlined, and then illustrates the Packet Tracking Mode in which the next LDU has a 2 byte Preamble (not underlined), in a scenario with no special data recovery problems.

FIG. 5(c) illustrates a normal underlined LDU, followed by an LDU which is missing more than 2 bytes from the Preamble (not underlined), which LDU is then discarded.

FIG. 5(d) illustrates an LDU having a normal Preamble, followed by three bytes (starting at the arrow) before the Preamble of the subsequent LDU. The three bytes indicate an incomplete or corrupt LDU which is then discarded.

FIG. 5(e) illustrates an underlined LDU having a normal Preamble, but which is missing more than 2 bytes from the Link Data Unit. This error cannot be detected by the Link Layer, but will be detected later by the Relay Layer.

FIG. 6 illustrates how the RelaySeqNum field is used as a trailer to further strengthen the Link Layer error checking. The way it is used is based on the value inside it. For example:

FIG. 6(a) illustrates the checking of the Relay Seq Num of an LDU, as the Link Data Unit trailer, to ensure that the LDU is valid and uncorrupted.

First 6(b) illustrates an LDU which is missing a trailer Relay Seq Num, indicating a corrupted Link Data Unit to be discarded.

Length Field

This field is used to indicate the number of bytes in the Data field. Since its maximum number can only be one byte long, therefore the Data field holds only 255 bytes at maximum. The maximum number of bytes in a single LDU is 264 bytes (255 bytes of data plus 9 bytes overhead). The minimum number of bytes in a single LDU that is carrying one byte of data is 10 bytes. In brief, the Length field is used to do LDU checking by blocks.

LinkSeqNum Field

FIG. 5(a) illustrates a normal data transmission scenario with no special data recovery problems, in which a single LDU, having a structure as illustrated in FIG. 3, is underlined, and the Data or payload data is double underlined. The LDU ends with the Relay Seq Num 0xFF, which is a negative representation of minus one in twos complement. As illustrated, the underlined LDU is followed by the header (0xAA, etc.) of the next LDU.

This field indicates the sequence number of the transmitted LDU relative to other LDUs. This field is incremented for every packet transmitted regardless if the current transmission is a new or a repeat of an older transmission. Based on the LinkSeqNum, if the Receiver detects a discrepancy then it requests a retransmission of the missing packet. The Receiver, then, always resets its LinkSeqNum to match the Sender's last packet LinkSeqNum.

If the Sender is able to retransmit the requested LinkSeqNum, then it retransmits all the LDUs that follow the requested one regardless of whether the Sender had already sent these LDUs or not. The Sender always ignores any forward resynchronization requests. Since the LinkSeqNum can wrap around, then the only requests for resynchronization packets that are honored are the ones that fall within the range of the current LinkSeqNum less the maximum number of minimum messages in the transmit sliding window.

The transmit (Tx) sliding window is illustrated graphically in FIG. 10 with reference to a circular queue, and represents a window encompassing a number (which can vary depending on the lengths of the Link Data Units) of Link Data Units behind the Link Data Unit currently being transmitted. The Tx sliding window moves forward in time as packets are transmitted, to enable a packet encompassed within the Tx sliding window to be retransmitted.

Assume a Tx sliding window of 528 bytes (2*(255 data bytes+9 bytes protocol overhead)), then the valid range is LinkSeqNum B 52 (52 is based upon minimum length LDUs of 10 bytes (1 byte of data)), anything else is ignored. It is up to the transmission task to decide whether or how the packet retransmission is performed. The receiving task only requests the retransmission. Note that the Link Layer of the Receiver does not care about having duplicate packets, it only requires that the LinkSeqNum be continuously incremental.

Figure 7:
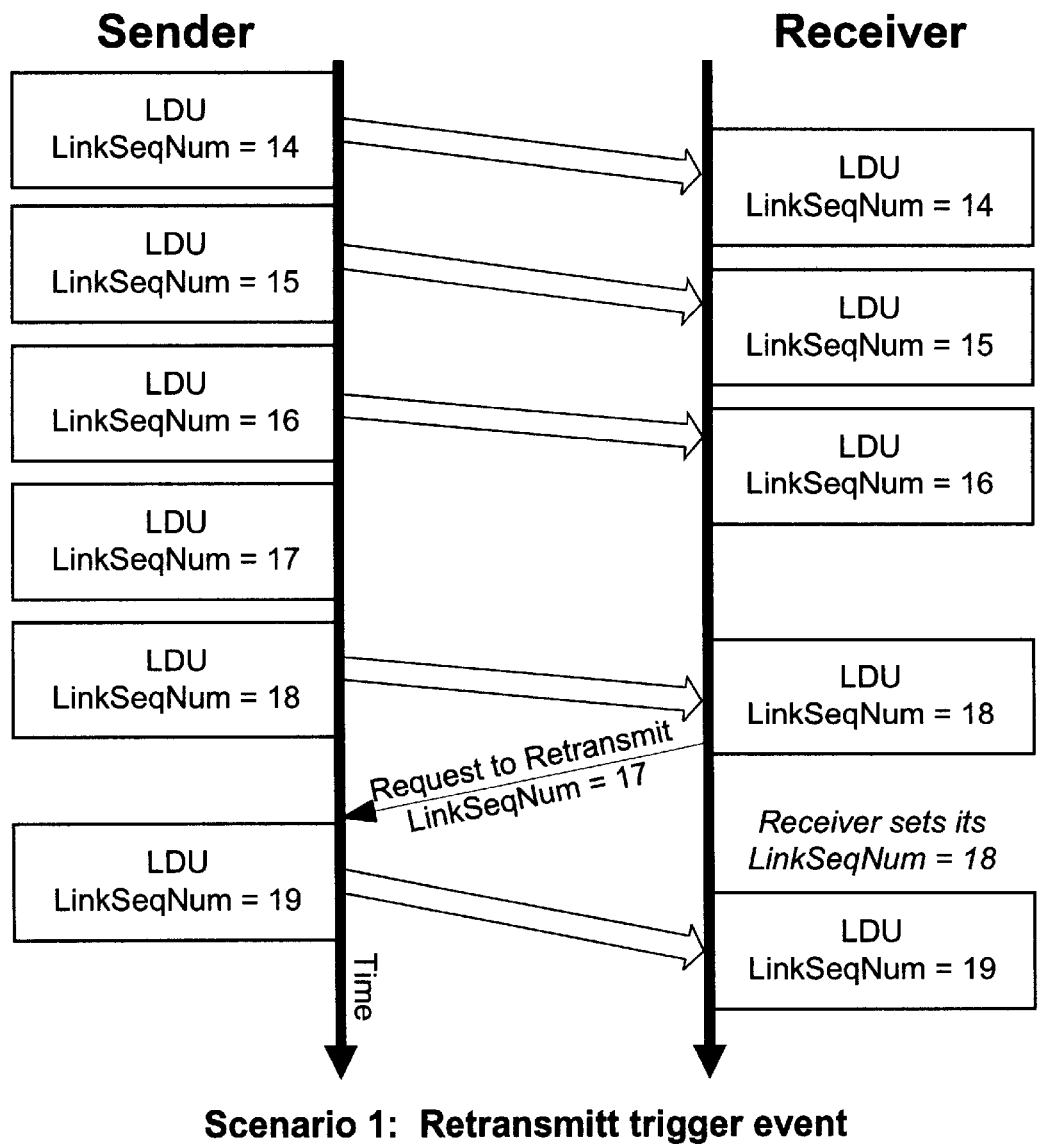
FIG. 7 is a graphic representation of a first scenario of a generic case of a retransmit trigger event.

FIG. 7 is a graphic representation of a first scenario of a generic case of the following retransmit trigger event.

The Link Layer of the Sender and the Receiver are synchronized on LinkSeqNum of 14, 15, and 16.

The Receiver at this point is expecting an LDU with LinkSeqNum=17, instead, the Receiver receives an LDU with LinkSeqNum=18.

The Link Layer of the Receiver generates a request to retransmit the LDU with the LinkSeqNum equal to 17.

The Link Layer of the Receiver resets its LinkSeqNum to 18.

The LDU with LinkSeqNum=19 may at this point be the one missing (i.e. LinkSeqNum=17) or it may be a new one. In either case, the Link Layer is satisfied.

Assume a Tx sliding window of 528 bytes (2*(255 data bytes+9 bytes protocol overhead)), then the valid range is LinkSeqNum—52 (52 is based upon minimum length LDUs of 10 bytes (1 byte of data)), anything else is ignored. It is up to the transmission task to decide whether or how the packet retransmission is performed. The receiving task only requests the retransmission. Note that the Link Layer of the Receiver does not care about having duplicate packets, it only requires that the LinkSeqNum be continuously incremental.

The data to be sent is "A", "B", "C", "D", "E".

The Link Layer of the Sender and the Receiver are synchronized on 14.

The Receiver at this point is expecting an LDU with LinkSeqNum=15, instead, the Receiver receives an LDU with LinkSeqNum=16.

The Receiver's Link Layer generates a retransmit request of the packet with the LinkSeqNum=15.

The Receiver's Link Layer resets its LinkSeqNum to 16.

Meanwhile, the Sender has already sent two LDUs with data "A", "D" and "E".

Assume that the Sender is able to resend the missing LDU, however, the Sender resends all the LDUs after the missing one (i.e. "A", "B", "C", "D", and "E")

The Receiver's queue should have "A", "C", "D", "E", "B", "C", "D", "E".

FIG. 9 is a graphic representation of a third series of a retransmit trigger event in which the transmitter receives a request to retransmit with a forward resynchronization which is ignored.

The data to be sent is "A", "B", "C", "D", "E"

The Link Layer of the Sender and the Receiver are synchronized on 14.

The Receiver at this point is expecting an LDU with LinkSeqNum=15, instead, the Receiver receives an LDU with LinkSeqNum=50 (assume a corruption that passed the link layer error detection).

The Receiver's Link Layer generates a retransmit request of the packet with the LinkSeqNum=15.

The Receiver's Link Layer resets its LinkSeqNum to 50.

Meanwhile, the Sender has already sent an LDU with LinkSeqNum of 16 and data "C".

The Receiver at this point is expecting an LDU with LinkSeqNum=51, instead, the Receiver receives an LDU with LinkSeqNum=16 (which is a correct one).

The Receiver's Link Layer generates a retransmit request of the packet with the LinkSeqNum=51.

The Receiver's Link Layer resets its LinkSeqNum to 16.

Assume the Sender is able to resend back the missing LDU of 15, however, the Sender resends all the LDUs after the missing one (i.e. "A, B, C, D, and E")

While resending, the Sender receives a Forward Resync request which is ignored.

The Receiver's queue will have "A, B, C, D, B, C, D, E".

Link Layer Tx Queue

The Transmit queue of the Sender is managed by the Link Layer API functions. Some of these functions are also available to the Relay Layer to trigger the events. The Transmit circular queue has a sliding window pointer as illustrated in FIG. 10 that is used for resynchronization of packets. The sliding window size is equal to two maximum LDUs (i.e. 528 bytes). The resynchronization action is only triggered by the Receiver's Request to Retransmit. Whenever a Resynchromization command is parsed, if the required LinkSeqNum packet exists in the sliding window, then both the sliding window pointer and the ISR Packet Pointer are set to that packet, as illustrated in FIG. 10(b).

Figure 10A:
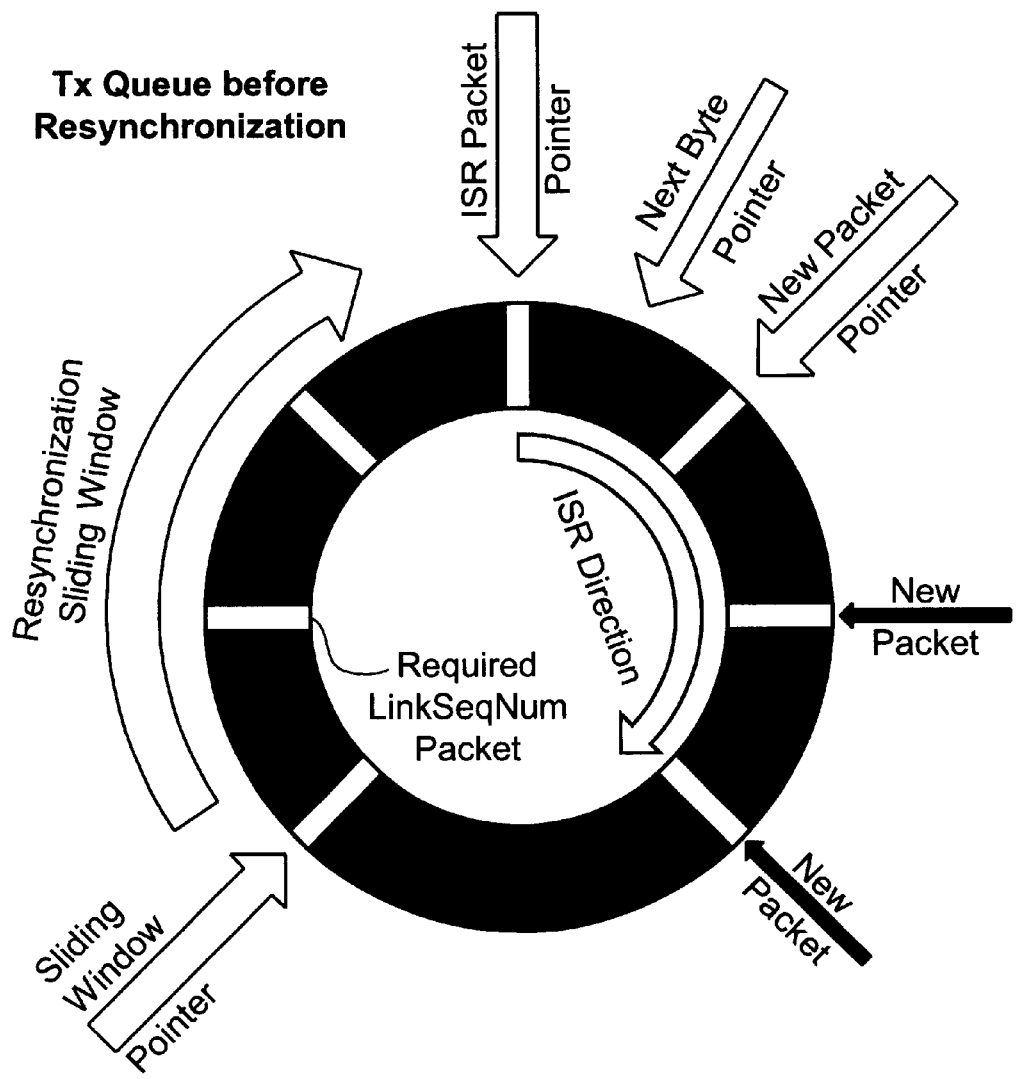
FIGS. 10(a)–(b) graphically illustrate of a Tx queue state before and after a request for resynchronization, and illustrate the resetting of a sliding window pointer and an interrupt service routine packet pointer after the request.
Figure 10B:
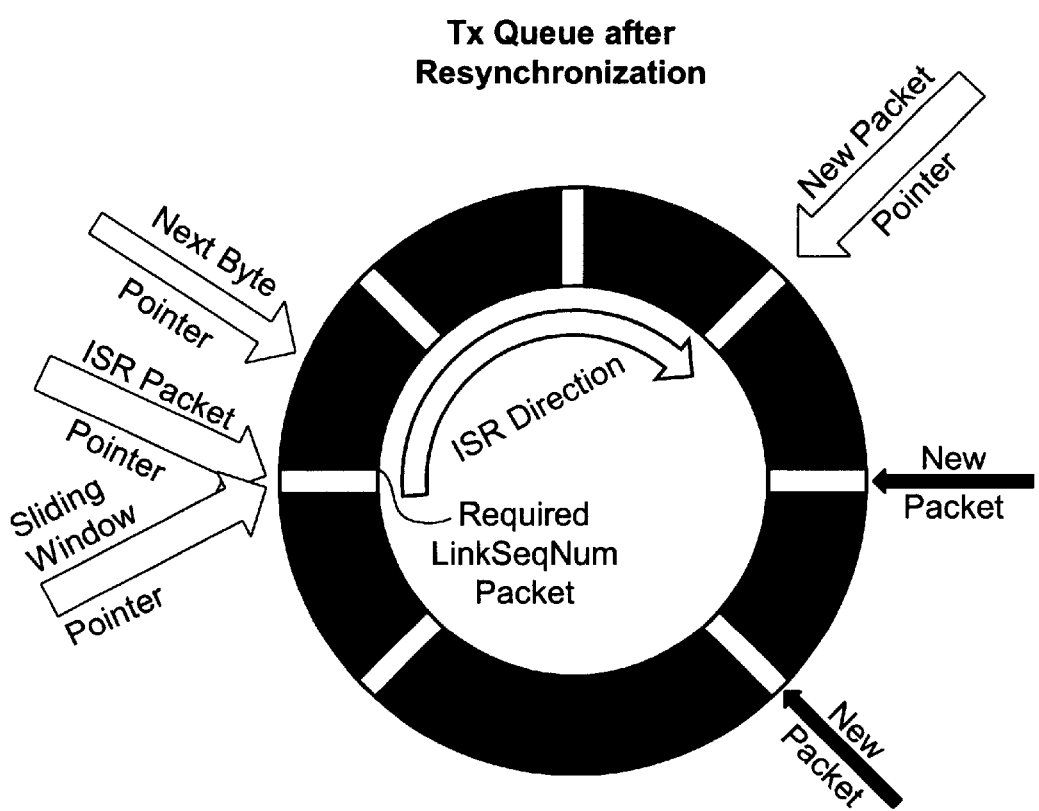
Figure 11B:
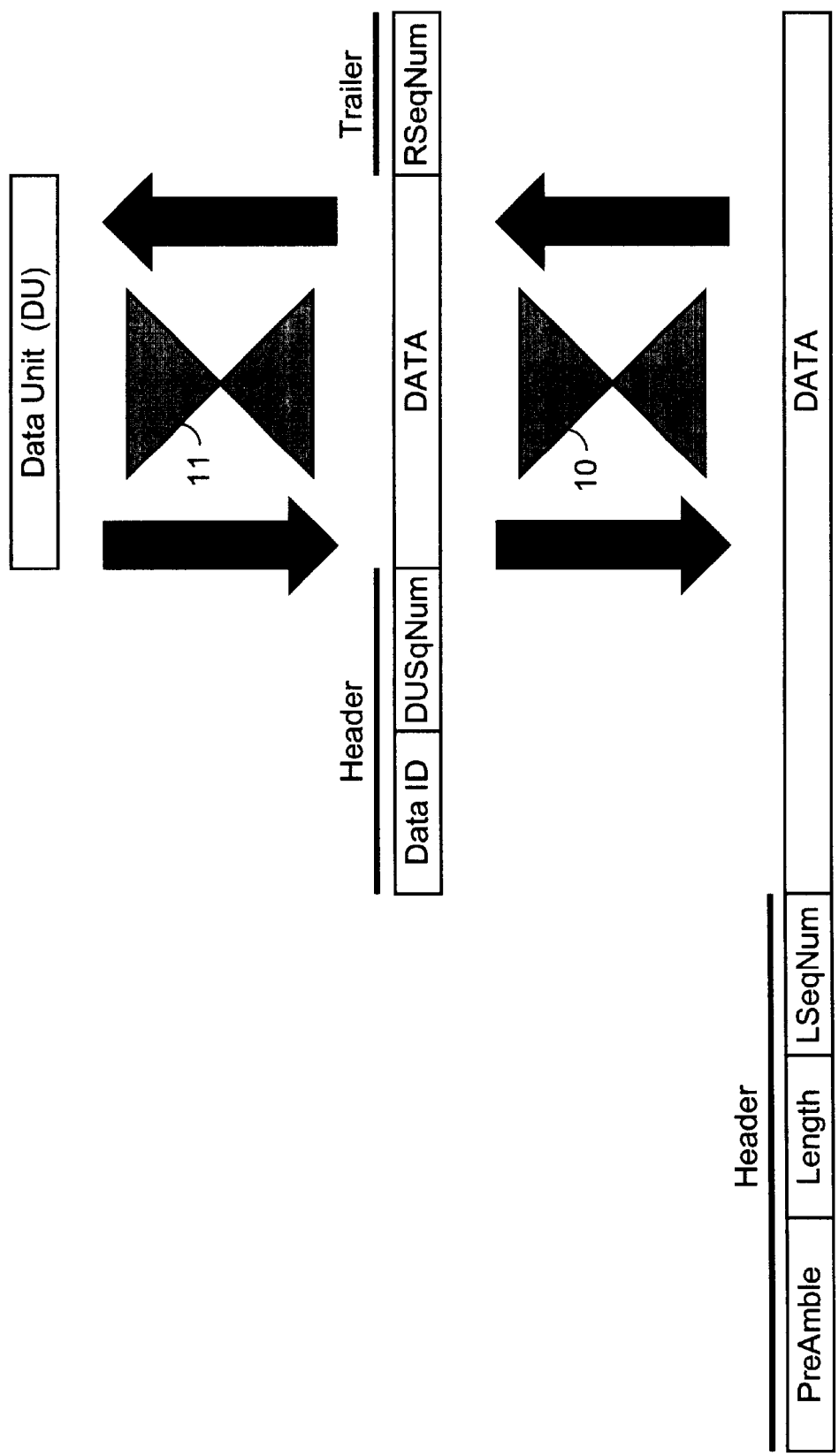
FIG. 11(b) illustrates the function of the relay layer in converting a Data Unit (DU) into a Relay Data Unit (RDU) and the function of the link layer in converting a Relay Data Unit into a link data unit (LDU).

FIG. 10 is a graphical representation of a Tx queue state before (FIG. 10(a)) and after (FIG. 11(b)) a request for resynchronization, and illustrates the resetting of the sliding window pointer and the ISR packet pointer after a request.

The transmit Link Layer checks for a resynchronization request after the conclusion of each packet transmission and resizes the sliding window accordingly.

Preamble bytes are inserted into the transmitter buffer along with the packet by the access functions using the Link Layer Staff Packet function.

The Staff Packet function calls the Link Tx Enable Interrupt function, which enables the transmit interrupt.

The Transmit ISR receives a byte count and the ISR Packet Pointer. The ISR Packet Pointer is shared between the transmitter ISR and the transmitter in the Driver Task.

The transmitter in the driver task maintains two pointers in the transmitter buffer, The Sliding Window Pointer and the New Packet Pointer. The driver transmitter determines whether a packet in between the Sliding Window Pointer and the ISR Pointer shall be retransmitted or not. If a retransmission is required, the driver transmitter sets the ISR Packet Pointer and the Sliding Window Pointer to the packet that is to be retransmitted. If a retransmission is not required, the driver transmitter advances the ISR Pointer in linear incremental fashion until no LDUs are available.

The sliding window is resized based on packet sizes and has a maximum amount of 528 bytes.

RDU Transmission Protocol—RELAY LAYER

Data ID Field

The Data ID identifies the owner and the type of the Data Unit. Whenever a task would like to send data to the serial port, it must register with the Driver Task through the Registration API supplying the Data ID field.

RelaySeqNum Field

The restriction on this field is based on the length of a single DU, which cannot be more than 1 k. If a Data Unit is carried in a single packet, the RelaySeqNum field is set to −1. If a Data Unit is carried in multiple packets, the RelaySeqNum field of the first packet is set to 1. The RelaySeqNum fields of the subsequent packets are advanced in an incremental fashion. The sign of the RelaySeqNum field of the last packet is inverted—set negative (i.e. a DU of 4 packets has the RelaySeqNum 1, 2, 3, −4). This field is used mainly to signal the end of a multiple-packet message or that a message is a complete Data Unit. The Receiver upon completing the assembly of a complete data unit, notifies the owner task of such Data ID using RTOS message. [DUSeqNum Field:]

DUSeqNum Field

The Receiver Relay layer, to reassemble correctly a multi-packet Data Unit, uses the DUSeqNum field. This field is also used to detect and eliminate duplicates that were caused by the retransmit protocol of the Link Layer. Another use of this field is to keep real-time sequences of the data. Based on the DUSeqNum and the RelaySeqNum, the assembler function determines a complete Data Unit and triggers the delivery event of the data Unit to the task that owns this particular Data ID. The DUSeqNum is unique within each Data Id Field.

Relay Layer Assembler Algorithm:

The Relay Layer Assembler function is a multi-option assembler. Depending on the time of Registration for services, the application may set constraints on the assembly of packets. As explained previously, the Link Layer protocol can produce duplicate and out of synchronization RDU's or packets. Therefore, the Relay Layer Assembler can provide the following options:

(1) Receive out-of-sync and duplicate packets.

(2) Receive out-of-sync and no duplicate packets.

(3) Receive in-sync and no duplicate packets.

Of course, the assembler algorithm complexity increases whenever the options become more demanding (i.e. going from 1 to 3).

Receive Out-of-sync and Duplicate Packets

First option, the assembler uses the following scheme:

For every complete Data Unit received in one LDU, it is delivered to the Data ID owner.

If the RDU is a part of multi-packet DU (more than 255 bytes), then it is buffered for assembly.

Trigger the Assembler Manager.

Receive Out-of-sync and NO Duplicate Packets

Second option, the assembler uses the following scheme (assume a Tx sliding window of 528 bytes):

For every complete Data Unit received in one LDU and having the expected DuSeqNum, then it is delivered to the Data ID owner.

If this complete Data Unit has not been seen before, then it is delivered to the Data ID owner.

If it has been seen before it is discarded.

If the RDU is a part of a multi-packet DU (above 255 bytes), then it is buffered for assembly. Trigger the Assembler Manager.

Receive In-sync and NO Duplicate Packets

Third option, the assembler uses the following scheme:

For every complete Data Unit received in one LDU and having the expected DuSeqNum, then it is delivered to the Data ID owner.

If not in sequence or if the RDU is a part of a multi-packet DU, then it is buffered for assembly.

Trigger the Assembler manager.

Buffering Purpose On Receive Side:

In order to maintain transmission of the Line Data Units of Packets [units], the size of the assembler buffer must be related to the size of the transmit resynchronization buffer. In addition, there will be a time delay of approximately 100 msec after the last buffered packets to determine when to purge the assembler buffer.

The Assembler uses a fixed pipe buffer which is equal to the size of the transmit sliding window plus one maximum packet size. If the sliding window contains 2 maximum size packets of 528 bytes, then the assembler buffer is 528+259= 777 bytes. The maximum Tx packet size is 264 bytes. The maximum Relay Layer Received packet size is 259 bytes including pryload data of maximum length.

For every received packet, delivered or buffered, its size is counted so that the Assembler determines when to purge the first LDU in the assembly buffer.

Upon receiving an RDU or a packet and whenever it completes a Data Unit, then the Data Unit is delivered to the Data ID owner.

DUSeqNum Field

The receiver Relay Layer, to reassemble correctly a multi-packet Data Unit, uses the DUSeqNum field. This field is also used to detect and eliminate duplicates that were caused by the retransmit protocol of the Link Layer. Another use of this field is to keep real-time sequences of the data. Based on the DUSeqNum and the RelaySeqNum, the assembler function determines a complete Data Unit and triggers the delivery event of the Data Unit to the task that owns this particular Data ID. The DUSeqNum is unique within each Data Id Field.

It should be noted that whenever the buffer becomes full and a new packet arrives, there is no harm in discarding the first packet because the transmitter side is not able to resend the completion of it anyway. The reason is that the Tx sliding window is out of the Resynchronization request range. Also, the assembly of the Data Unit must be performed on a packet basis and in real time.

Figure 12:
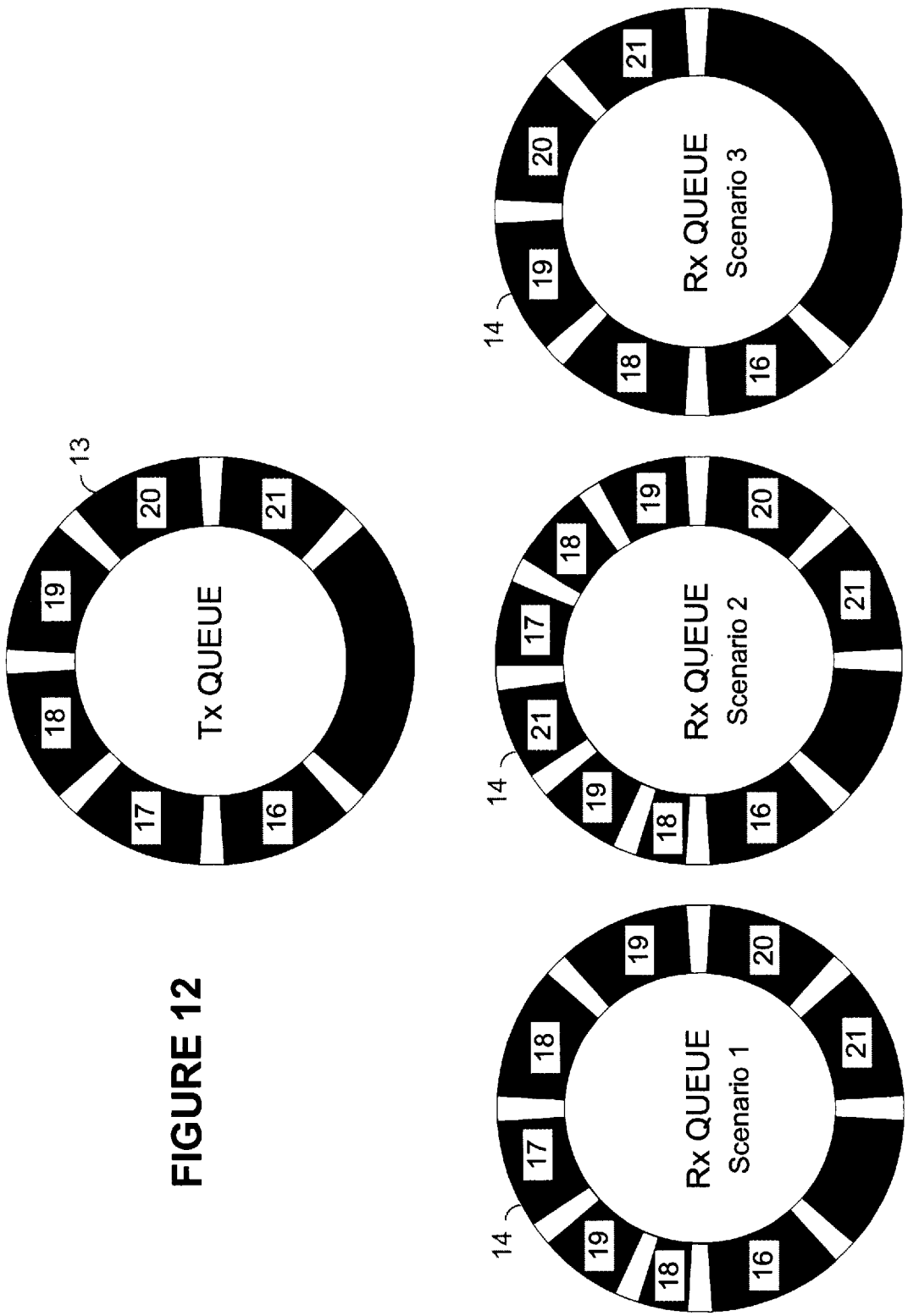
FIG. 12 illustrates examples of three different scenarios wherein the Tx Queue starts with the DUSeqNum 16, 17, 18, 19, 20, and 21, and the options available under each scenario.

FIG. 12 illustrates examples wherein the Tx Queue started with the following DUSeqNum 16, 17, 18, 19, 20, and 21.

Assume that all packets are independent:

Scenario 1

Option 1: deliver 16, 18, 19, 17, 18, 19, 20, and 21 (Duplicates/Out-of-sync).

Option 2: deliver 16, 18, 19, 17, 20, and 21 (No Duplicates/Out-of-sync).

Option 3: deliver 16, 17, 18, 19, 20, and 21 (In-Sequence).

Scenario 2

Option 1: deliver 16, 18, 19, 21, 17, 18, 19, 20, and 21 (Duplicates/Out-of-sync).

Option 2: deliver 16, 18, 19, 21, 17, and 20(No Duplicates/Out-of-sync).

Option 3: deliver 16, 17, 18, 19, 20, and 21 (In-Sequence).

Scenario 3

Option 1: deliver 16, 18, 19, 20, and 21 (Duplicates/Out-of-sync).

Option 2: deliver 16, 18, 19, 20, and 21 (No Duplicates/Out-of-sync).

Option 3: deliver 16, 18, 19, 20, and 21 (In-Sequence after 100 msec delay).

Assume that packets 16 and 17 are a single Data Unit, and the rest are independent:

Scenario 1

Option 1: deliver 18, 19, 16 +17, 18, 19, 20, and 21 (Duplicates/Out-of-sync).

Option 2: deliver 18, 19, 16 +17, 20, and 21 (No Duplicates/Out-of-sync).

Option 3: deliver 16 +17, 18, 19, 20, and 21 (In-Sequence).

Scenario 2

Option 1: deliver 18, 19, 21, 16 +17, 18, 19, 20, and 21 (Duplicates/Out-of-sync).

Option 2: deliver 18, 19, 21, 16 +17, and 20 (No Duplicates/Out-of-sync).

Option 3: deliver 16+17, 18, 19, 20, and 21 (In-Sequence).

Scenario 3

Option 1: deliver 18, 19, 20, and 21 (Duplicates/Out-of-sync).

Option 2: deliver 18, 19, 20, and 21 (No Duplicates/Out-of-sync).

Option 3: deliver 18, 19, 20, and 21 (In-Sequence after 100 msec delay).

Assembly Recovery

In order to maintain transmission of the Link Data Units or packets, the size of the assembler buffer must be related to the size of the transmit resynchronization buffer. In addition, there will be a time delay of approximately 100 msec after the last buffered packets to determine when to purge the assembler buffer.

1. If the first Data Unit in the buffer is incomplete and enough unexpected data has been received to confirm that the Transmit buffer no longer contains the missing Data Unit, then the incomplete Data Unit(s) are deleted. An error is recorded. Starting from the beginning, any deliverable Data Unit in the buffer is delivered at this time.

2. If a Data Unit has been missed and enough unexpected data has been received to confirm that the Transmit buffer no longer contains the missing Data Unit, then receipt of the missing Data Unit is not possible. An error should be recorded. Starting from the beginning, any deliverable Data Unit in the buffer is delivered at this time.

3. If the first Data Unit in the buffer is separated from subsequent Data Units by the early arrival of new data, then the new data is discarded. After completion of the first Data Unit, all of the new data should be received again.

4. If an arriving Data Unit has a match in the buffer, the earlier data is replaced with the received data and any subsequent Data Units are deleted. They should be received again.

5. If an arriving Data Unit is unexpected, it is placed at the end of the buffer if there is space for it.

6. If an arriving Data Unit is unexpected and there is no place for it in the buffer, then apply either case 1 or case 2 above.

7. If unexpected data is in the buffer and the expected complete Data Unit is received, it is delivered outside of the buffer. Any subsequent Data Units in sequence in the buffer are deleted until the end of the buffer.

8. For cases 1 and 2, if the count of unexpected data in the buffer exceeds the size of the Relay buffer but not the Transmit buffer, then the first Data Unit is deleted and the expected count adjusted accordingly. An error is recorded. Starting from the beginning, any deliverable Data Unit in the buffer is delivered at this time. While a preferred embodiment of the present invention for a multi-logical access for a serial data link are described in detail herein, it should be apparent that the disclosure and teachings of the present invention will suggest many alternative designs to those skilled in the art.

What is claimed is:

1. A method of providing shared access to a serial data link to transfer data between multiple applications on a transmitter side of the serial data link and multiple applications on a receiver side of the serial data link comprising:

utilizing a transfer protocol to transfer the data over the serial data link as one or more link data units, wherein on both the transmitter side and the receiver side of the serial data link, the transfer protocol comprises, i. a relay layer protocol used for exchanging the data between the multiple applications and a link layer, wherein a relay layer on the transmitter side disassembles the data into relay data units and delivers the relay data units to the link layer, and on the receiver side receives the relay data units from the link layer and assembles the relay data units into the data for delivery to the multiple applications and also detects transmission errors in the relay data units, and, ii. a link layer protocol used for exchanging the data between the relay layer and the serial data link, wherein the link layer on the transmitter side converts the relay data units received from the relay layer into the link data units for transmission over the serial data link, and on the receiver side converts the link data units received over the serial data link into the relay data units for delivery to the relay layer and also detects transmission errors in the link data units, wherein data transmitted in one function call of an application is treated as a data unit, the data unit being transmitted as the one or more link data units, each of the one or more link data units comprising a Preamble field, a Length field, a LinkSeqNum field, a DataID field, a DUSeqNum field, a Data field, and a RelaySeqNum field.

2. A method of providing shared access to a serial data link as claimed in claim 1, wherein function call data transmitted in one function call of an application is treated as a data unit, and the function call data is transmitted over the serial data link as the one or more link data units.

3. A method of providing shared access to a serial data link as claimed in claim 1, wherein the relay layer on the receiver side assembles a data unit from the relay data units, and an application designated to receive the data unit can elect to receive a plurality of other data units, i. out of sequence and with a duplicate of the data unit, or ii. out of sequence and without the duplicate of the data unit, or iii. not out of sequence and without the duplicate of the data unit.

4. A method of providing shared access to a serial data link as claimed in claim 1, wherein the relay layer provides the multiple applications with application program interfaces to receive the data, and uses real time operating system messages to deliver the data.

5. A method of providing shared access to a serial data link as claimed in claim 1, wherein the link layer maintains a driver transmitter serial queue and a driver receiver serial queue, and provides associated transmitter and receiver interrupt service routines.

6. A method of providing shared access to a serial data link as claimed in claim 1, used for providing full duplex communication between a band held telephone and a computer over the serial data link.

7. A method of providing shared access to a serial data link as claimed in claim 6, wherein the serial data link comprises an RS-232 serial data line.

8. A method of providing shared access to a serial data link as claimed in claim 1, wherein each of the multiple applications registers to provide a specific data identification value, and on the receiver side application data with the specific data identification value is sent to a designated application.

9. A method of providing shared access to a serial data link as claimed in claim 1, wherein application data transmitted in one function call of an application is treated as a data unit, and the data unit is transmitted as the one or more link data units, wherein each of the one or more link data units includes a sequence field which indicates a sequence number for each of the one or more link data units relative to other link data units, and wherein the sequence number is incremented with each of the one or more link data units transmitted.

10. A method of providing shared access to a serial data link as claimed in claim 9, wherein if the receiver side detects a discrepancy in sequence numbers of consecutively received link data units, then the receiver side issues a resynchronization request to the transmitter for a retransmission of the missing link data unit.

11. A method of providing shared access to a serial data link as claimed in claim 10, wherein if the transmitter side is able to retransmit the missing link data unit, then the transmitter side retransmits the requested link data unit and all subsequent link data units.

12. A method of providing shared access to a serial data link as claimed in claim 10, wherein the transmitter side disregards the resynchronization request of the missing link data unit if the missing link data unit has a sequence number with a higher value than a sequence number of a recently transmitted link data unit.

13. A method of providing shared access to a serial data link as claimed in claim 1, wherein application data transmitted in one function call of an application is treated as a data unit, and wherein each of the one or more link data units includes a sequence field which indicates a sequence number and wherein the sequence number is incremented with each subsequent relay data unit transmitted.

14. A method of providing shared access to a serial data link as claimed in claim 13, wherein another sequence number of a last one of the relay data units of the data unit indicates that it is a final relay data unit of the data unit.

15. A method of providing shared access to a serial data link as claimed in claim 1, wherein application data transmitted in one function call of an application is treated as a data unit, and the data unit is transmitted as the one or more link data units, wherein each of the one or more link data units includes a sequence field which indicates a data unit sequence number for referencing the data unit and which is incremented with each subsequent data unit from the application.

16. A method of providing shared access to a serial data link as claimed in claim 15, wherein the relay layer of the receiver side uses the data unit sequence number to assemble the data unit from the relay data units and to detect a duplicate relay data unit.

17. A method of providing shared access to a serial data link as claimed in claim 1, wherein the Preamble field is comprised of four bytes which are hexadecimal representations used for indicating a start of each of the one or more link data units.

18. A method of providing shared access to a serial data link as claimed as claim 17, further including acquiring of packet synchronization mode and a packet tracking mode, where on the receiver side, during the packet synchronization mode, all four bytes of the Preamble field must be detected as being valid, and after the packet synchronization mode is achieved, the receiver side enters the packets tracking mode, wherein only two of the four bytes of the Preamble field must be detected as being valid in each of the one or more link data units.

19. A method of providing shared access to a serial data link as claimed in claim 17, wherein the Length field, the LinkSeqNum field, the DataID field, the DUSeqNum field and the RelaySeqNum field are each one byte in length.

20. A method of providing shared access to a serial data link as claimed in claim 19, wherein a maximum number of bytes in one of the one or more link data units is 264 bytes, comprising 255 bytes of the data and 9 bytes of the fields, and a minimum number of bytes in another of the one or more link data units is 10 bytes, comprising 1 byte of the data and 9 bytes of the fields.

21. A method of providing shared access to a serial data link as claimed in claim 19, wherein if a prior one of the one or more link data units is received having a normal preamble followed by less than six bytes before the Preamble field of another of the one or more link data units, then the prior one of the one or more link data units is discarded.

22. A method of providing shared access to a serial data link as claimed in claim 1, wherein the RelaySeqNum field has a value which is incremented with each subsequent relay data unit of the data unit, and a sign of the value of the RelaySeqNum field of a last relay data unit of the data unit is negative.

23. A method of providing shared access to a serial data link as claimed in claim 1, wherein if the receiver side detects a discrepancy in a value in the LinkSeqNum field of consecutively received link data units, then the receiver side issues a resynchronization request to the transmitter side for a retransmission of a missing link data unit wherein the missing link data unit is identified to the transmitter side by an identified LinkSeqNum value of the missing link data unit.

24. A method of providing shared access to a serial data link as claimed in claim 23, wherein if the transmitter side is able to retransmit the missing link data unit having the identified LinkSeqNum value, then the transmitter side retransmits the missing link data unit and all of the one or more link data units that follow the missing link data unit.

25. A method of providing shared access to a serial data link as claimed in claim 23, wherein the transmitter side disregards the resynchronization request for the missing link data unit when the identified LinkSeqNum value is higher than a current LinkSeqNum value of a recently transmitted link data unit.

26. A method of providing shared access to a serial data link as claimed in claim 1, wherein the transmitter side maintains a transmitter buffer which is managed by the link layer on the transmitter side and has a transmission sliding window which is used for retransmission of a requested link data unit.

27. A method of providing shared access to a serial data link as claimed in claim 26, wherein the transmission sliding window includes a plurality of link data units behind the link data unit currently being transmitted.

28. A method of providing shared access to a serial data link as claimed in claim 27, wherein, to maintain a real-time sequence of the one or more link data units, a receiver assembler buffer size of a receiver assembler buffer is proportional to a transmitter buffer size of the transmitter buffer.

29. A method of providing shared access to a serial data link as claimed in claim 28, wherein the receiver assembler buffer size is equal to a size of the transmitter sliding window plus a size of one maximum length link data unit.

30. A method of providing shared access to a serial data link as claimed in claim 28, wherein a size of each link data unit received by the receiver assembler buffer is counted to determine that a previously received link data unit in the receiver assembler buffer is to be purged.

31. A method of providing shared access to a serial data link as claimed in claim 26, wherein the transmission sliding window comprises a circular queue.

32. A method of providing shared access to a serial data link as claimed in claim 26, wherein if the transmitter side retransmits the requested link data unit, then both a sliding window pointer and an interrupt service routine packet pointer have been set to values indicating the requested link data unit.

33. A method of providing shared access to a serial data link as claimed in claim 32, wherein the transmitter side maintains two pointers pointing into the transmitter buffer, the sliding window pointer and a new link data unit pointer, and the transmitter side determines whether the requested link data unit is located within the sliding window pointer and the interrupt service routine pointer.

34. A method of providing shared access to a serial data link as claimed in claim 26, wherein the link layer on the transmitter side checks for a resynchronization request after completion of transmission of each of the one or more link data units and the transmitter side then resizes the transmission sliding window.

35. A method of providing shared access to a serial data link to transfer payload data between multiple applications on a transmitter side of the serial data link and multiple applications on a receiver side of the serial data link comprising:
  utilizing a transfer protocol to transfer the payload data over the serial data link, where the transfer protocol treats the payload data transmitted as one or more data packets, wherein on both the transmitter side and the receiver side of the serial link, the transfer protocol comprises:
    i. a relay layer protocol for exchanging the payload data on the transmitter side between the multiple applications and a link layer, wherein a relay layer on the transmitter side assembles the payload data into relay data units and delivers the relay data units to the link layer, and on the receiver side receives the relay data units from the link layer and assembles the relay data units into the payload data for delivery to the multiple applications, and on the receiver side also detects transmission errors in the relay data units;
    ii. a link layer protocol for exchanging the payload data between the relay layer and the serial data link, wherein the link layer on the transmitter side assembles the relay data units received from the relay layer into the one or more data packets for transmission over the serial data link, and on the receiver side assembles the one or more data packets received over the serial data link into the relay data units for delivery to the relay layer, and on the receiver side also detects transmission errors in the one or more data packets,
  wherein payload data transmitted in one function call of an application is treated as a data unit, the data unit being transmitted as the one or more data packets, each of the one or more data packets comprising a Preamble field, a Length field, a LinkSeqNum field, a DataID field, a DUSeqNum field, a Data field, and a RelaySeqNum field.

36. A method of providing shared access to a serial data link as claimed in claim 35, wherein the relay layer on the receiver side assembles a data unit from the relay data units, and an application designated to receive the data unit can elect to receive a plurality of other data units,
  i. out of sequence and with a duplicate of the data unit, or
  ii. out of sequence and without the duplicate of the data unit, or
  iii. in sequence and without the duplicate of the data unit.

37. A method of providing shared access to a serial data link to transfer data between multiple applications on a transmitter side of the serial data link and multiple applications on a receiver side of the serial data link comprising:
  a. treating application data transmitted in one function call of an application as a data unit;
  b. transmitting the data unit as one or more data packets;
  c. structuring each of the data packets such that each of the data packets includes,
    i. a preamble field for indicating a start for each of the data packets;
    ii. a length field for indicating a length for each of the data packets:
    iii. a data identification field for identifying the application transmitting the data unit of each of the data packets;
    iv. a data field including payload data for each of the data packets;
    v. a first sequence field for indicating a data unit sequence number for each of a plurality of data units addressed to the application and wherein the data unit sequence number is incremented with each of the plurality of data units to be transmitted to the application,
    vi. a second sequence field for indicating a relay sequence number for each of the data packets from the data unit and wherein the relay sequence number is incremented for each of the data packets from the data unit, and
    vii. a third sequence field for indicating a packet sequence number for each of the data packets relative to other data packets and wherein the packet sequence number is incremented with subsequently transmitted data packets.

38. A method of providing shared access to a serial data link as claimed in claim 37, wherein the second sequence field of a last relay data unit of the data unit indicates that it is a final relay data unit of the data unit.

39. A method of providing shared access to a serial data link as claimed in claim 37, wherein a relay layer on the receiver side uses the second sequence field to assemble the data unit, and the relay layer is used to detect duplicate data packets.

40. A method of providing a shared access to a serial data link as claimed in claim 37, wherein the transmitter side maintains a transmitter buffer which is managed by the transmitter side and has a transmission sliding window which is used for retransmission of an unreceived data packet.

41. A method of providing shared access to a serial data link as claimed in claim 40, wherein the transmission sliding window includes a plurality of data packets after a current packet.

42. A method of providing shared access to a serial data link as claimed in claim 37, wherein the transmission sliding window comprises a circular queue.

* * * * *